United States Patent [19]
Smith

[11] Patent Number: 6,098,736
[45] Date of Patent: Aug. 8, 2000

[54] MOTORCYCLE SWING ARM

[75] Inventor: Donald Jerry Smith, Brooklyn Park, Minn.

[73] Assignee: Chrome Specialties, Inc., Fort Worth, Tex.

[21] Appl. No.: 09/001,946

[22] Filed: Dec. 31, 1997

[51] Int. Cl.[7] ..................................................... B62D 61/02
[52] U.S. Cl. .......................................... 180/227; 280/284
[58] Field of Search ........................... 180/227; 280/284, 280/285, 280

[56] References Cited

U.S. PATENT DOCUMENTS

| | | | |
|---|---|---|---|
| 1,157,431 | 10/1915 | Shimmin | 280/284 |
| 1,220,606 | 3/1917 | Chelstrom | 280/283 |
| 1,458,506 | 6/1923 | Wesson | 280/283 |
| 2,522,867 | 9/1950 | Goldammer | 280/283 |
| 4,087,109 | 5/1978 | Davis | 280/284 |
| 4,433,851 | 2/1984 | Miyakoshi et al. | 280/277 |
| 4,660,854 | 4/1987 | Suzuki et al. | 280/283 |
| 5,487,443 | 1/1996 | Thurm | 280/284 |
| 5,749,591 | 5/1998 | Thurm | 280/284 |

OTHER PUBLICATIONS

Brochure, *Rolling Thunder*, Manufactures of Fine Motorcycle Frames.
Brochure, *Bourget's Bike Works*, Fat Tire Frames (date unknown, but possibly more than one year prior to filing date).
Brochure, *Atlas Precision*, Pro Magnum (date unknown, but possibly more than one year prior to filing date).
Brochure, *Iron Works*, Frame and Suspension Resources, compiled by Dennis Stamp, Jul. 1997, pp. 66–73.
Catalog, *Hot Rod Bikes*, Mar. 1996, pp. 39–46.
Catalog *Chopper Guys Biker Products*, 1997.
Magazine, *Thunder Alley*, Jun. 1997, p. 64.
Magazine, *European Dealer News*, Jun. 1997, Issue No. 46.

*Primary Examiner*—Lanna Mai
*Assistant Examiner*—Andrew J. Fischer
*Attorney, Agent, or Firm*—Max Ciccarelli

[57] ABSTRACT

A swing arm assembly with the swing arm side plate on the drive side of the motorcycle being spaced inward from the corresponding motorcycle frame side plate wherein the belt or chain extends between the swing arm side plate located on the drive side of the motorcycle and the corresponding motorcycle frame side plate, instead of extending inward of the swing arm side plate.

3 Claims, 3 Drawing Sheets

MOTORCYCLE SWING ARM

BACKGROUND OF THE INVENTION

1. Field of the Invention

This invention relates in general to motorcycles and in particular to swing arm assemblies for motorcycles.

2. Description of the Prior Art

Swing arm assemblies are well known in the motorcycle art. They provide a means of shock absorption between the rear wheel of a motorcycle and the frame.

FIG. 1 generally shows a prior-art swing arm 10 connected to the frame 12 of a motorcycle (only part of the frame is shown, and for simplicity, not all the hardware is depicted). Generally, the swing arm pivotally connects to the frame of the motorcycle along an axis often referred to as the swing arm pivot axis 30. In FIG. 1, the swing arm pivot axis 30 is perpendicular to the page. The swing arm pivot axis passes through the swing arm and through the motorcycle frame side plates 18a and 18b on the right and left sides of the motorcycle frame (on left motorcycle frame side, plate 18b is shown in FIG. 1). At the opposite end of the swing arm is the rear axle axis 34. In FIG. 1, rear axle axis 34 is perpendicular to the page. Shock absorbing means are connected between the swing arm and the motorcycle frame in ways well known in the art so as to provide shock absorption to the person riding the motorcycle.

FIG. 2 shows a perspective view of a prior-art swing arm 20 of the particular type used on Harley-Davidson® Softail® motorcycles. Swing arm 20 comprises swing arm side plates 22a and 22b, V-shaped frame members 24a and 24b, and crossmembers 26 and 27. Carried by swing arm side plates 22a and 22b are swing arm pivots 28a and 28b located along swing arm pivot axis 30. At the apex of V-shaped frame members 24 are rear axle attachment lugs 32 located along rear axle axis 34.

FIG. 3 shows a partial view of prior-art swing arm 20 as seen from line 3—3 of FIG. 2. FIG. 2 also shows the location of the motorcycle tire 40, motorcycle frame side plates 18a and 18b, and the cross section of belt 42 (it is well known in the art that some motorcycles use chains instead of belts), as those elements would be seen from line 3—3 of FIG. 2. The tire 40 is located between the motorcycle frame side plates 18a and 18b and centered along the centerline 44 of the motorcycle. Immediately inside the motorcycle frame side plates 18a and 18b are located the swing arm side plates 22a and 22b. On the drive side of the motorcycle (in this example, the left side), the belt 42 is located between the tire 40 and the swing arm side plate 22b.

All of the above is well known in the art. However, many motorcycle enthusiasts desire to use on their motorcycles tires wider than the "stock" tires ("stock" tires are the tires that are sold as original equipment with the motorcycle). The reasons for wanting wider tires vary, but the common ones are to alter the aesthetics or the performance of the motorcycle.

As shown in FIG. 3, there is a clearance 50 between tire 40 and belt 42. It is well known in the art that the stock tire can be replaced with a tire slightly larger by taking up some of the clearance 50. Because of the limited clearance 50, however, the overall width of the new tire cannot be much larger than the overall width of the stock tire because otherwise the new tire will interfere with the belt 42.

It is also well known in the art to provide conversion kits for moving the belt 42 closer to the swing arm side plate 22b. This increases the clearance 50, thus allowing a slightly larger tire to be used.

It is also well known in the art to alter the frame of the motorcycle (usually by cutting and re-welding) to increase the distance between the motorcycle frame side plates 18a and 18b. This technique allows very wide tires to be used. However, because the motorcycle frame is altered, a new serial number must be obtained. Since obtaining a new serial number is a time-consuming procedure, it makes the conversion procedure less appealing to many motorcycle owners.

SUMMARY OF THE INVENTION

The present invention provides a swing arm assembly with the swing arm side plate on the drive side of the motorcycle being spaced inward from the corresponding motorcycle frame side plate wherein the belt or chain extends between the swing arm side plate located on the drive side of the motorcycle and the corresponding motorcycle frame side plate, instead of extending inward of the swing arm side plate.

It is the general object of the invention to allow replacement of the rear motorcycle tire with a tire as large an overall width as possible, and without widening the motorcycle frame.

The above as well as additional objects, features, and advantages will become apparent in the following description.

DETAILED DESCRIPTION OF THE INVENTION

Figure 4:
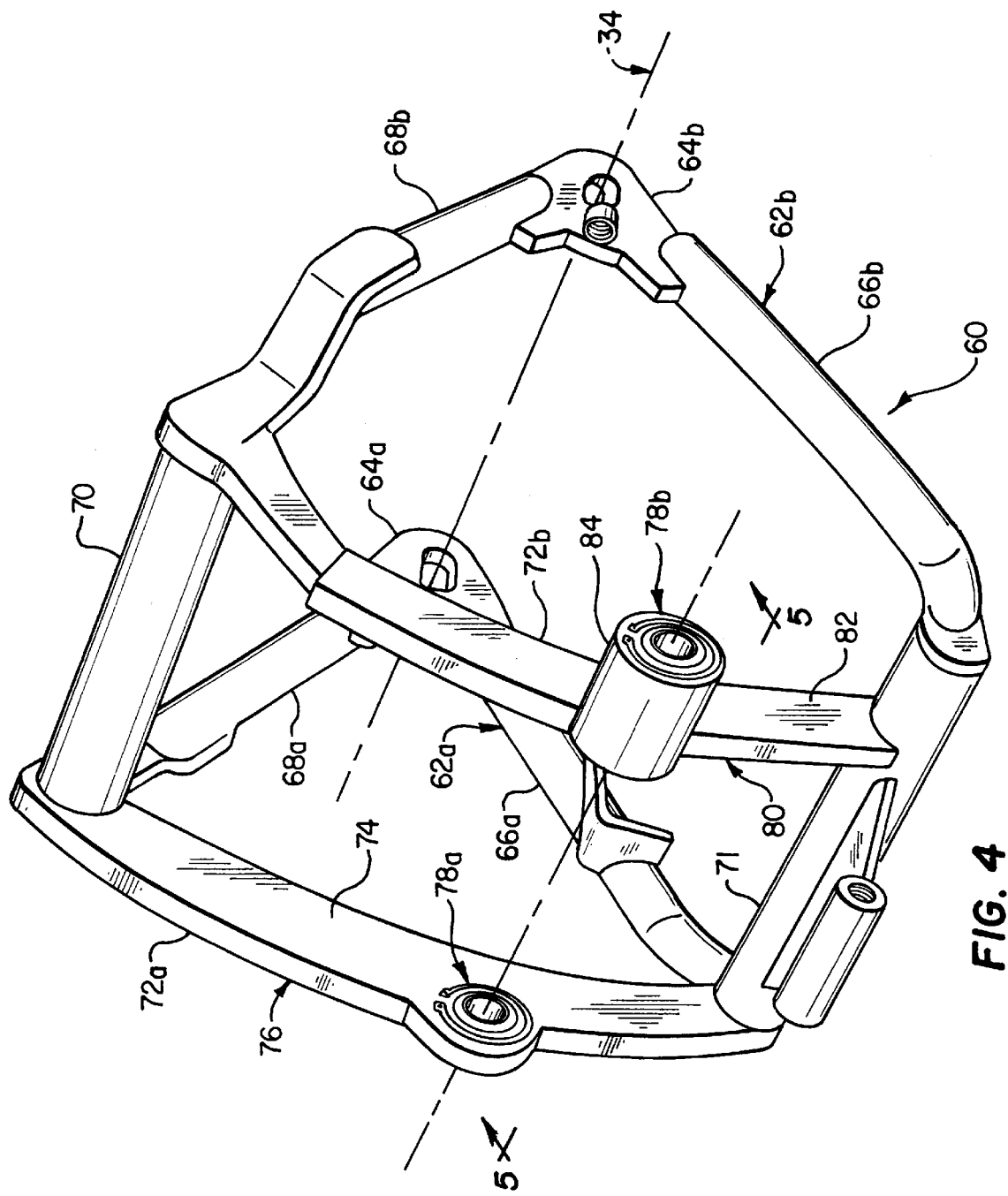
FIG. 4 shows a perspective view of the swing arm of the present invention.

Referring first to FIG. 4, the swing arm 60 of the present invention is shown. Right and left V-shaped members 62a and 62b are shown. V-shaped members 62a and 62b comprise right and left rear axle attachment lugs 64a and 64b, right and left lower side members 66a and 66b, and right and left upper side members 68a and 68b. Right and left rear axle attachment lugs 64a and 64b allow for attachment of swing arm 60 to the rear axle (not shown) along rear axle axis 34. Right upper and lower side members 68a and 66a are attached to right rear axle attachment lug 64a to form V-shaped member 62a. Likewise, left upper and lower side members 68b and 66b are attached to left rear axle attachment lug 64b to form V-shaped member 62b. Upper and lower cross members 70 and 71 connect the right and left V-shaped members 62a and 62b.

Right swing arm side plate 72a connects the upper and lower cross members 70 and 71 and the distal ends of the V-shaped member 62a. Right swing arm side plate 72a has an inward facing surface 74 and an opposed outward facing surface 76 (hidden in FIG. 4 and shown in FIG. 5). Right swing arm side plate 72a carries a swing arm pivot (also referred to herein as a frame-attachment pivot) 78a. Swing arm pivots 78a are well known in the art and comprise the appropriate bearings, retaining rings, and other hardware.

The outward end of swing arm pivot 78a extends approximately to the outward facing surface 76 of swing arm side plate 72a. The inward end of swing arm pivot 78a extends approximately to the inward facing surface 74 of swing arm side plate 72a. The swing arm pivot 78a pivotally connects to the motorcycle frame side plate (not shown in FIG. 4, but shown generally in FIG. 5 at numeral 18a). When the swing arm 60 is connected to the motorcycle frame, right swing arm side plate 72a is located adjacent the right motorcycle frame side plate 18a.

Left swing arm side plate 72b connects the upper and lower cross members 70 and 71 and the distal ends of the V-shaped member 62b. Compared to the left swing arm side plates of the prior art, left swing arm side plate 72b is spaced inward from the left motorcycle frame side plate 18b. This results in the lower end of left swing arm side plate 72b connecting to the lower cross member 71 at a point inward of the left end of lower cross member 71. Left swing arm side plate 72b has an inward facing surface 80 (hidden in FIG. 4 but shown in FIG. 5) and an opposed outward facing surface 82.

Figure 1:
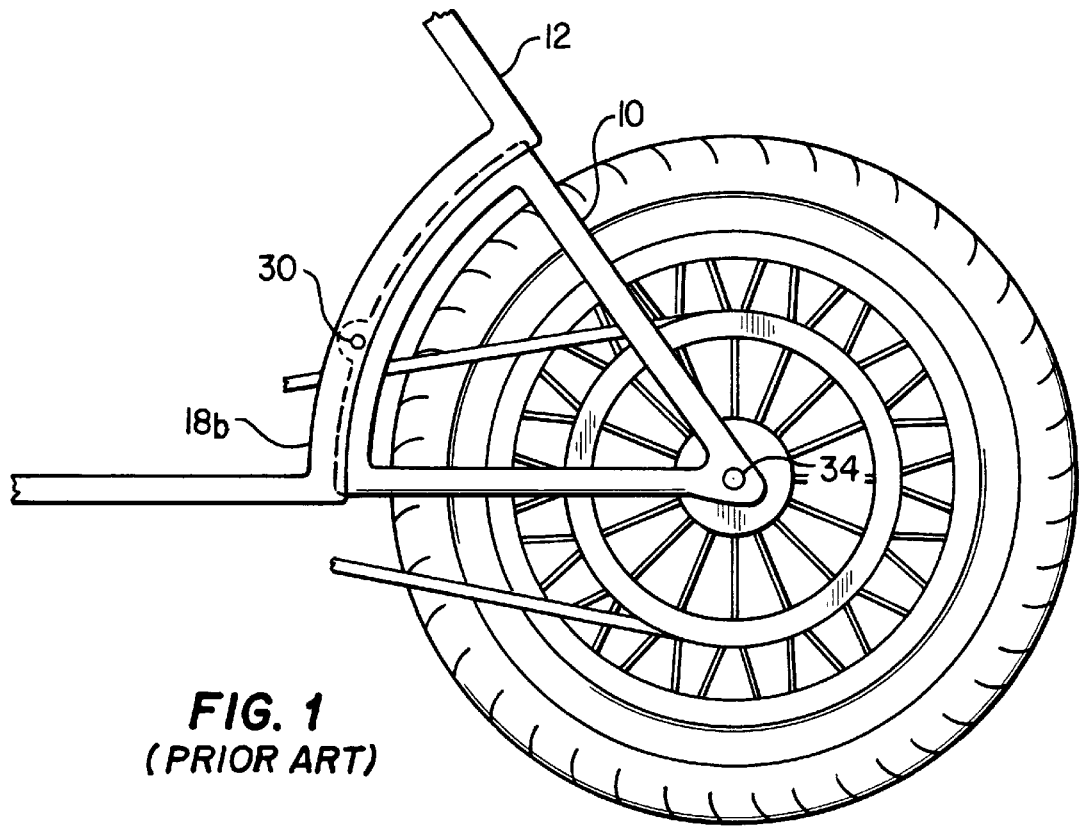
FIG. 1 shows a side view of the rear portion of a motorcycle with a prior-art swing arm.
Figure 2:
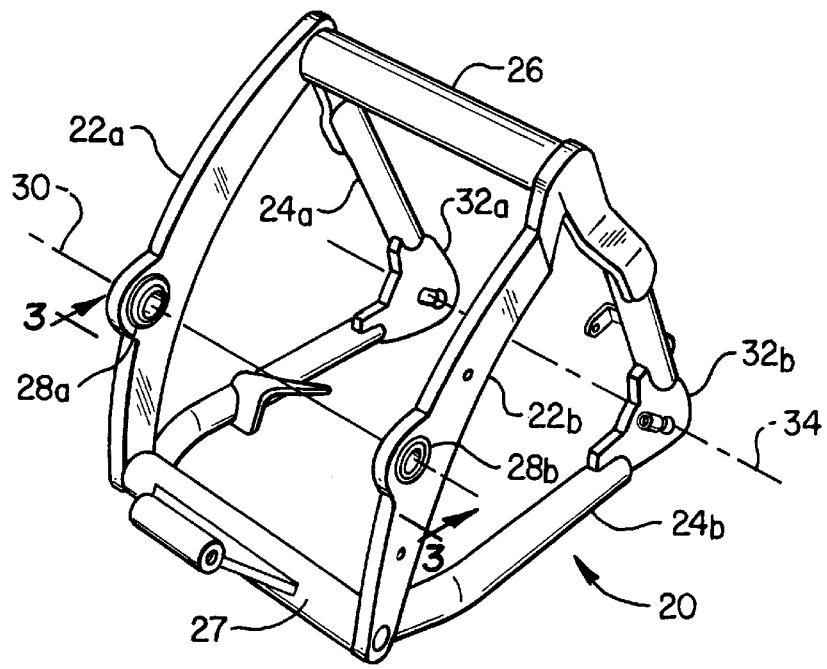
FIG. 2 shows a perspective view of a prior-art swing arm.

Left swing arm side plate 72b carries a swing arm pivot (also referred to herein as a frame-attachment pivot) 78b. The inward end of swing arm pivot 78b extends approximately to the inward facing surface 80 of swing arm side plate 72b. The outward end of swing arm pivot 78b extends beyond the outward facing surface 82 of swing arm side plate 72b. Swing arm pivot 78b comprises a cylinder 84 transversely connected to the swing arm side plate 72b. Cylinder 84 extends beyond the outward facing surface 82 by at least the width of the motorcycle's belt or chain 42 (not shown in FIG. 4, but shown in FIG. 5). Cylinder 84 houses and cooperates with the bearings, retaining rings, and other hardware of the swing arm pivot 78b. Swing arm pivot 78b is similar in construction and operation as swing arm pivot 78a except that it is wider. The swing arm pivot 78b pivotally connects to the left motorcycle frame side plate (not shown in FIG. 4, but shown generally in FIGS. 1 at numeral 18b, and in FIG. 5 at numeral 18b).

When the swing arm 60 is connected to the motorcycle frame, the outward end of left swing arm pivot 78b is located adjacent the left motorcycle frame side plate 18b. The outward facing surface 82 of left swing arm side plate 72b is spaced inward from the left motorcycle frame side plate 18b by a distance greater than the width of the motorcycle's belt or chain. Those skilled in the art will appreciate that because the swing arm side plates 72a and 72b are located outside the largest radius of the rear motorcycle tire, left swing arm side plate 72 can be moved inward as much as desired, even inward of the left edge of the rear motorcycle tire. This is described in more detail below.

Figure 5:
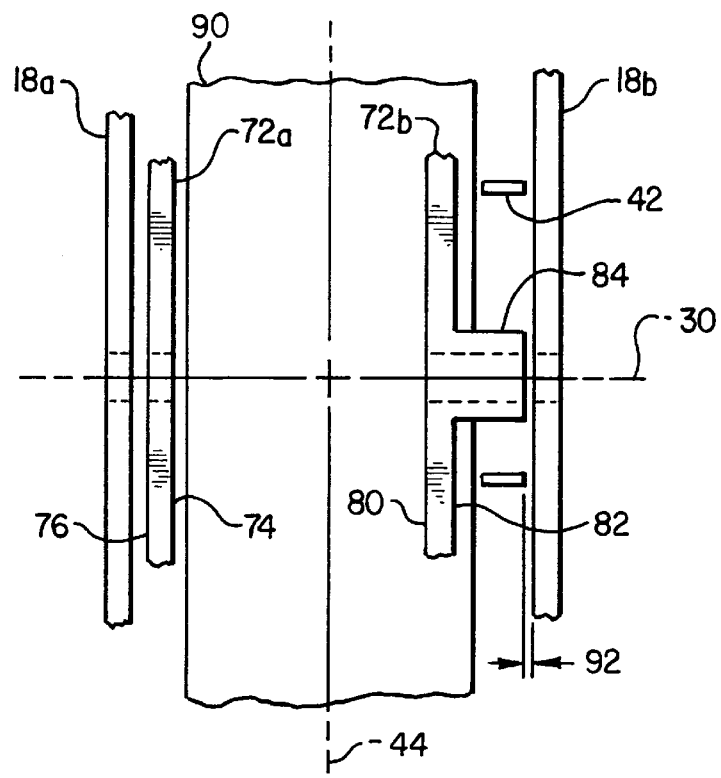
FIG. 5 shows a partial view of the swing arm of FIG. 4 as seen from line 5—5 of FIG. 4, but with additional components shown therewith.

Referring now to FIG. 5, a partial view of the swing arm 60 is shown as seen from line 5—5 of FIG. 4. FIG. 5 more clearly illustrates certain aspects of swing arm 60. For example, it shows how the outward surface 76 of right swing arm side plate 72a is adjacent the right motorcycle frame side plate 18a. It also illustrates how left swing arm side plate 72b is spaced inward from the left motorcycle frame side plate 18b. The belt or chain 42 is shown passing between left swing arm side plate 72b and left motorcycle frame side plate 18b. It is also shown how the left swing arm side plate 72b is spaced inward to such an extend that it occupies the vertical plane of the tire 90.

Figure 3:
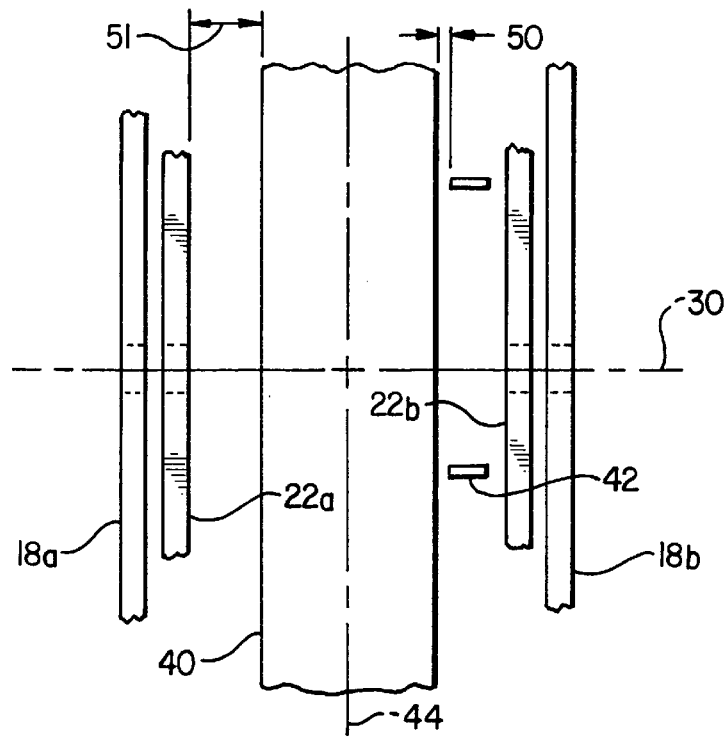
FIG. 3 shows a partial view of the prior-art swing arm of FIG. 2 as seen from line 3—3 of FIG. 2.

A comparison of FIGS. 3 and 5 shows how swing arm 60 allows the use of a tire larger than was possible with swing arm 20 of the prior art. Referring first to FIG. 3, it is evident that although tire 40 can be replaced by a slightly larger tire, the limited nature of clearance 50 does not allow a substantially larger tire to be used. Although a larger clearance 51 exists on the side opposite clearance 50, if a larger tire is used that takes advantage of clearance 51 without the availability of a similar clearance on the opposite side, the centerline of the larger tire will not coincide with the centerline 44 of the motorcycle, thereby inhibiting the handling and performance characteristics of the motorcycle. Referring next to FIG. 5, and comparing FIG. 5 to FIG. 3, it is shown how the swing arm 60 of the present invention allows the use of a much larger tire 90, while ensuring that the centerline of the tire 90 coincides with the centerline 44 of the motorcycle. As shown in FIG. 5, belt 42 has been moved closer to motorcycle frame side plate 18b. Clearance 92 represents the distance between the outside edge of belt 42 and the inside surface of motorcycle frame side plate 18b. In the prior art, it was not possible to obtain a clearance as small as clearance 92 because the swing arm side plate was located between the belt and the motorcycle frame side plate 18b (see FIG. 3). The comparison of FIGS. 3 and 5 also shows that the swing arm 60 of the present invention accommodates a much larger tire than previously possible without widening the motorcycle frame (that is, the distance between motorcycle frame side plates 18a and 18b).

Those skilled in the art would appreciate that additional hardware not described herein would be necessary when a conventional swing arm is replaced with a swing arm 60 of the present invention. For example various spacers are required to move various components of the transmission outward to match the new (outwardly displaced) position of belt 42. As another example, spacers of different widths will be required depending on the particular rim used to ensure that the centerline of the new tire 90 coincides with the centerline of the motorcycle. As a still further example, a longer axle will be required in the preferred embodiment, because the distance between rear axle attachment lugs 64a and 64b is larger than the distance between the corresponding components of the prior art swing arms. (The larger distance between rear axle attachment lugs is achieved by increasing the bend in the lower and upper side members 66 and 68). As a still further example, replacement fender struts would be required to accommodate the wider tire (the old fender struts can be cut off near the frame, and the new struts can be bolted to the frame).

The following is provided as an example of the increased tire width allowed by the improved swing arm of the present invention. A standard Harley-Davidson® Softail® motorcycle, usually comes with a stock tire having a width of approximately 130 millimeters. The techniques of the prior art allowed the stock tire to be replaced with a tire having a width of at most approximately 140 millimeters (without widening the frame and while keeping the centerline of the tire in line with the centerline of the motorcycle). By comparison, the swing arm of the present invention allows a tire with a width of approximately 200 millimeters to be used (without widening the frame and while keeping the centerline of the tire in line with the centerline of the motorcycle).

While the invention has been particularly shown and described with reference to a preferred embodiment, it will be understood by those skilled in the art that various changes in form and detail may be made therein without departing from the spirit and scope of the invention.

What is claimed is:

1. A swing arm assembly adapted for attachment to the frame of a motorcycle, the assembly comprising:

a pair of V-shaped frame members, each V-shaped frame member having a corresponding rear axle attachment lug at its apex;

upper and lower crossmembers transversely connecting the pair of V-shaped frame members at ends opposite the rear axle attachment lug;

a drive-side swing arm side plate, and an opposing swing arm side plate connecting the upper and lower crossmembers and the V-shaped frame members;

a drive-side frame-attachment pivot carried by the drive-side swing arm side plate and an opposing frame-attachment pivot carried by the opposing swing arm side plate;

the drive-side frame-attachment pivot extending outwardly from the drive-side swing arm side plate and having a proximal end at the drive-side swing arm side plate and a distal end; and the drive-side swing arm side plate being spaced inward from the corresponding rear axle attachment lug and adapted to receive a flexible drive means outwardly of the drive-side swing arm side plate and between the distal and proximal ends of the drive-side frame-attachment pivot.

2. An improved swing arm comprising:

opposed left and right swing arm side plates, each swing arm side plate having an upper portion and a lower portion;

left and right frame-attachment pivots adapted to pivotally connect each swing arm side plate to a frame of a motorcycle, each frame-attachment pivot being located along a swing arm pivot axis;

an upper cross-member substantially perpendicular to the swing arm side plates and connecting the upper portion of the left swing arm plate to the upper portion of the right swing arm plate;

a lower cross-member substantially perpendicular to the swing arm side plates and connecting the lower portion of the left swing arm plate to the lower portion of the right swing arm plate, the lower cross-member extending beyond the left swing arm side plate and terminating at an extended end portion;

left and right rear axle attachment lugs adapted to attach to a motorcycle axle;

a lower left side member connecting the left rear axle attachment lug to the extended end portion of the lower cross-member;

an upper left side member connecting the left rear axle attachment lug to the upper portion of the left swing arm side plate;

a lower right side member connecting the right rear axle attachment lug to the lower portion of the right swing arm side plate;

an upper right side member connecting the right rear axle attachment lug to the upper portion of the right swing arm side plate; and wherein the swing arm is adapted to receive a flexible drive means exteriorly of the left swing arm side plate between a distal and a proximal end of the left side frame-attachment pivot.

3. A motorcycle comprising a frame, a rear wheel, and a swing arm assembly for connecting the frame to the rear wheel, the swing arm assembly comprising:

a pair of V-shaped frame members, each V-shaped frame member having a corresponding rear axle attachment lug at its apex;

upper and lower crossmembers transversely connecting the pair of V-shaped frame members at ends opposite the rear axle attachment lug;

a drive-side swing arm side plate, and an opposing swing arm side plate connecting the upper and lower crossmembers and the V-shaped frame members;

a drive-side frame-attachment pivot carried by the drive-side swing arm side plate and an opposing frame-attachment pivot carried by the opposing swing arm side plate;

the drive-side frame-attachment pivot extending outwardly of the drive-side swing arm side plate and having a proximal end at the drive-side swing arm side plate and a distal end; and the drive-side swing arm side plate being spaced inward from the corresponding rear axle attachment lug and adapted to receive a flexible drive means outwardly of the drive-side swing arm side plate and between the distal and proximal ends of the drive-side frame-attachment pivot.

* * * * *